(12) United States Patent
Gao et al.

(10) Patent No.: US 11,294,035 B2
(45) Date of Patent: Apr. 5, 2022

(54) LIDAR SYSTEM WITH CYLINDRICAL LENSES

(71) Applicant: Nuro, Inc., Mountain View, CA (US)

(72) Inventors: Lu Gao, Cupertino, CA (US); Wenjian Cai, Pleasanton, CA (US)

(73) Assignee: NURO, INC., Mountain View, CA (US)

( * ) Notice: Subject to any disclaimer, the term of this patent is extended or adjusted under 35 U.S.C. 154(b) by 682 days.

(21) Appl. No.: 16/030,648

(22) Filed: Jul. 9, 2018

(65) Prior Publication Data

US 2019/0018108 A1    Jan. 17, 2019

Related U.S. Application Data

(60) Provisional application No. 62/531,195, filed on Jul. 11, 2017.

(51) Int. Cl.
*G01S 7/48* (2006.01)
*G01S 7/481* (2006.01)
*G01S 17/89* (2020.01)
*G01S 17/931* (2020.01)

(52) U.S. Cl.
CPC .......... *G01S 7/4811* (2013.01); *G01S 7/4813* (2013.01); *G01S 7/4814* (2013.01); *G01S 7/4815* (2013.01); *G01S 7/4816* (2013.01); *G01S 17/89* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 3,064,252 A | 11/1962 | Varela | |
| 4,659,937 A * | 4/1987 | Cielo | G01N 21/952 250/559.24 |
| 4,952,911 A | 8/1990 | D'Ambrosia et al. | |
| 5,202,742 A * | 4/1993 | Frank | G01S 7/4811 356/5.1 |
| 5,682,229 A * | 10/1997 | Wangler | G01S 17/89 356/4.01 |
| 5,736,709 A * | 4/1998 | Neiheisel | B08B 7/0042 219/121.61 |
| 5,877,688 A | 3/1999 | Morinaka et al. | |
| D411,814 S | 7/1999 | Chibuka et al. | |
| 6,034,803 A | 3/2000 | Sullivan et al. | |
| 6,323,941 B1 | 11/2001 | Evans et al. | |

(Continued)

FOREIGN PATENT DOCUMENTS

| | | |
|---|---|---|
| JP | H036407 A | 1/1991 |
| JP | 2001256576 A | 9/2001 |
| JP | 2006177843 A | 7/2006 |

OTHER PUBLICATIONS

American National Standard for Safe Use of Lasers. ANSI ZI136.1-2000 (§4.5.1.5; 4.5.1.3-4 and p. 5) (19 pgs) (2000).

(Continued)

*Primary Examiner* — Hovhannes Baghdasaryan

(57) ABSTRACT

Described are LiDAR systems comprising a transmission optical system and a collection optical system utilizing a common lens or pieces derived from the same lens to reduce or eliminate image mismatch between the transmission optical system and the collection optical system.

20 Claims, 2 Drawing Sheets

(56) References Cited

U.S. PATENT DOCUMENTS

| | | | |
|---|---|---|---|
| 6,584,133 B1* | 6/2003 | Walker | H01S 5/4062 |
| | | | 372/101 |
| 7,030,968 B2 | 4/2006 | D'Aligny et al. | |
| 7,190,465 B2 | 3/2007 | Froehlich et al. | |
| 7,227,116 B2 | 6/2007 | Glecker et al. | |
| 7,281,891 B2 | 10/2007 | Smith et al. | |
| 7,534,984 B2 | 5/2009 | Gleckler | |
| D615,905 S | 5/2010 | Arnell | |
| 7,944,548 B2 | 5/2011 | Eaton | |
| 8,072,581 B1 | 12/2011 | Breiholz | |
| 8,675,184 B2 | 3/2014 | Schmitt et al. | |
| 8,836,922 B1 | 9/2014 | Pennecot et al. | |
| D734,211 S | 7/2015 | Ahn et al. | |
| 9,086,273 B1 | 7/2015 | Gruver et al. | |
| D755,673 S | 5/2016 | Ahn et al. | |
| 2003/0021037 A1* | 1/2003 | Nemes | G02B 27/30 |
| | | | 359/710 |
| 2006/0023058 A1* | 2/2006 | Tanaka | B23K 26/0823 |
| | | | 347/224 |
| 2006/0126690 A1* | 6/2006 | Kido | G02B 19/0028 |
| | | | 372/43.01 |
| 2007/0077696 A1* | 4/2007 | Tanaka | B23K 26/0738 |
| | | | 438/166 |
| 2007/0181810 A1* | 8/2007 | Tan | G01S 7/4811 |
| | | | 250/341.1 |
| 2013/0050669 A1* | 2/2013 | Maeda | G02B 13/24 |
| | | | 355/67 |
| 2013/0050803 A1* | 2/2013 | Stowe | G02B 13/08 |
| | | | 359/292 |
| 2016/0005611 A1* | 1/2016 | Moriwaka | H01L 29/78654 |
| | | | 438/479 |
| 2020/0081121 A1* | 3/2020 | Singhal | G01S 17/10 |

OTHER PUBLICATIONS

AN/TPS-43 Radar System Westinghouse. Westinghouse (pp. 3, 4, 6, 9 & 14) (14 pgs) (2007).

Chen et al. 3d object proposals for accurate object class detection. In Advances in Neural Information Processing Systems, pp. 424-432 (2015).

Chen et al. Monocular 3d object detection for autonomous driving. In Proceedings of the IEEE Conference on Computer Vision and Pattern Recognition, pp. 2147-2156 (2016).

Chen et al. Multi-view 3d object detection network for autonomous driving. In IEEE CVPR, pp. 1907-1915 (2017).

Co-pending U.S. Appl. No. 16/030,662, filed Jul. 9, 2018.

Deng et al. Amodal detection of 3d objects: Inferring 3d bounding boxes from 2d ones in rgb-depth images. In Conference on Computer Vision and Pattern Recognition (CVPR), INSPEC Accession No. 17355643 (2017).

Engelcke et al. Vote3deep: Fast object detection in 3d point clouds using efficient convolutional neural networks. In Robotics and Automation (ICRA), 2017 IEEE International Conference on, pp. 1355-1361 (2017).

Food and Drugs Rule—Performance Standards for Light-Emitting Products 21 C.F.R. § 1040.10 (19 pgs) (2005).

FOX. vol. 6: Active Electro-Optical Systems. The Infrared & Electro-Optical Systems Handbook. (326 pgs) (1993).

Geiger et al. Vision meets robotics: The KITTI dataset. The International Journal of Robotics Research 32(11):1231-1237 (2013).

Girshick et al. Rich feature hierarchies for accurate object detection and semantic segmentation. In Computer Vision and Pattern Recognition (CVPR) 2014 IEEE Conference on, pp. 580-587 (2014).

Gustavson. Diode-laser radar for low cost weapon guidance. SPIE 1633(VII):21-32 (pp. 21, 27, 28, 31 & Fig. 3.3-1) (1992).

Kawata et al. Development of ultra-small lightweight optical range sensor systems. 2005 IEEE/RSJ International Conference on Intelligent Robots and Systems. INSPEC Accession No. 8750287. (6 pgs) (Aug. 2-6, 2005).

Kilpela. Precise pulsed time-of-flight laser range finder for industrial distance measurements. Review of Scientific Instruments 72:2197 (Apr. 2001).

Lahoud et al. 2d-driven 3d object detection in rgb-d images. In Proceedings of the IEEE Conference on Computer Vision and Pattern Recognition, pp. 4622-4630 (2017).

Liu et al. SSD: Single shot multibox detector. In European conference on computer vision, pp. 21-37. Springer (2016).

Maturana et al. Voxnet: A 3d convolutional neural network for real-time object recognition. In IEEE/RSJ International Conference on Intelligent Robots and Systems (7 pgs) (Sep. 2015).

Mousavian et al. 3d bounding box estimation using deep learning and geometry. In Computer Vision and Pattern Recognition (CVPR), pp. 7074-7082 (2016).

Qi et al. Pointnet++: Deep hierarchical feature learning on point sets in a metric space. NIPS (14 pgs) (2017).

Qi et al. Frustum PointNets for 3D Object Detection from RGB-D Data. In Computer Vision and Pattern Recognition (CVPR), pp. 918-927 (Apr. 2018).

Qi et al. Pointnet: Deep learning on point sets for 3d classification and segmentation. Proc. Computer Vision and Pattern Recognition (CVPR), pp. 652-660 (2017).

Qi et al. Volumetric and multi-view cnns for object classification on 3d data. In Proceedings Computer Vision and Pattern Recognition (CVPR), pp. 5648-5656 (2016).

Ren et al. Accurate single stage detector using recurrent rolling convolution. In Computer Vision and Pattern Recognition (CVPR), pp. 5420-5428 (2017).

Ren et al. Faster r-cnn: Towards real-time object detection with region proposal networks. In Advances in neural information processing systems, pp. 91-99 (2015).

Ren et al. Three-dimensional object detection and layout prediction using clouds of oriented gradients. In Proceedings of the IEEE Conference on Computer Vision and Pattern Recognition, pp. 1525-1533 (2016).

Richmond et al. Polarimetric Imaging Laser Radar (PILAR) Program. In Advanced Sensory Payloads for UAV. Meeting Proceedings RTO-MP-SET-092, Paper 19. Neuilly-sur-Sein, France: RTO (35 pgs) (May 1, 2005).

Riegler et al. Octnet: Learning deep 3d representations at high resolutions. In Computer Vision and Pattern Recognition (CVPR), pp. 3577-3586 (2016).

Skolnik. Introduction to Radar Systems Handbook. McGraw-Hill Book Company. (590 pgs)(2d ed. 1980).

Skolnik. Radar Handbook. McGraw-Hill Book Company (1.18, 20.6 & 20.7-8) (846 pgs)(2d ed. 1990).

Song et al. Deep sliding shapes for amodal 3d object detection in rgb-d images. In Proceedings of the IEEE Conference on Computer Vision and Pattern Recognition, pp. 808-816(2016).

Song et al. Sliding shapes for 3d object detection in depth images. In Computer Vision—ECCV 2014, pp. 634-651 (2014).

Song et al. Sun rgb-d: A rgb-d scene understanding benchmark suite. In Proceedings of the IEEE Conference on Computer Vision and Pattern Recognition, pp. 567-576 (2015).

Su et al. Multi-view convolutional neural networks for 3d shape recognition. In Proceedings of the IEEE Conference on Computer Vision and Pattern Recognition, pp. 945-953 (2015).

Wang et al. O-cnn: Octree-based convolutional neural networks for 3d shape analysis. ACM Transactions on Graphics (TOG) 36(4):72 (2017).

Wu et al. 3d shapenets: A deep representation for volumetric shapes. In Proceedings of the IEEE Conference on Computer Vision and Pattern Recognition, pp. 1912-1920 (2015).

Xiang et al. Data-driven 3d voxel patterns for object category recognition. In Proceedings of the IEEE Conference on Computer Vision and Pattern Recognition, pp. 1903-1911 (2015).

Yu et al. Vehicle detection and localization on birds eye view elevation images using convolutional neural network. 2017 IEEE International Symposium on Safety, Security and Rescue Robotics (SSRR) INSPEC Accession No. 17315970 (2017).

(56) References Cited

OTHER PUBLICATIONS

Qi et al. Frustum PointNets for 3D Object Detection from RGB-D Data. Available from https://arxiv.org/pdf/1711.08488v1.pdf (15 pgs.) (Nov. 2017).

* cited by examiner

LIDAR SYSTEM WITH CYLINDRICAL LENSES

CROSS-REFERENCE

This application claims the benefit of U.S. Provisional Application No. 62/531,195, filed Jul. 11, 2017, which application is incorporated herein by reference.

BACKGROUND OF THE INVENTION

A LiDAR is a surveying technology that uses the time-of-flight (TOF) of light transmitted from the LiDAR and reflected/scattered back by objects in the environment to calculate its relative distance to those surrounding objects. It has wide applications from aerial scanning to territorial 3D mapping for autonomous vehicles. 3D maps are created by registering 2D optical image with 3D distance data points. Hence, to build precise and accurate 3D mapping, it is critical to have clear and non-distorted 2D optical images.

SUMMARY OF THE INVENTION

A LiDAR system typically comprises individual light sources, each paired with a photodetector, such that light originated from a light source is collected by a paired photodetector after reflection or scattering off an object in the environment. In such systems, a transmission optical system is used to collimate the laser beams and direct the collimated laser beams to the desired angles and a collection optical system is used to collect the scattered light rays to paired photodetectors. A transmission lens and a collection lens are required to share the same optical performance including the image size at each field position in order to match laser diodes and photodetectors positioned on respective printed circuit boards (PCBs). However, due to the slight differences that inevitably arise during the manufacturing process and the manufacturing tolerances in quality control, the lenses used in the transmission and collection pathways of a LiDAR often have different optical performances leading to mismatched 2D image size which can distort 2D optical images. Existing LiDAR technology attempts to remedy this problem by adding individual adjustments to each laser diode and photodetector after optical assembly. But such adjustments increase manufacturing complexity and cost.

One way to match the image size between transmission and receiving optics to eliminate the requirement for individual element alignment is to share the lens for both the transmission and the collection pathway. This requires certain beam splitting/combining optics to partially overlay transmission and receiving path, which results in reduced transmission and/or receiving efficiency and potential ghost light reflected from the shared lens. The LiDAR system configurations described herein avoid such disadvantages.

Described herein are methods of matching the image size and other optical performance characteristics between transmission optics and collection optics for a LiDAR system. The LiDAR systems disclosed herein avoid such image mismatch or distortion by using lenses with same optical performance for both transmission and collection pathways of the optical system. This optical system accomplishes this by either sharing the same lens for both the transmission and collection pathways or uses separate lenses cut from the same original lens. This system provides a cost-effective solution to image distortions arising from different optical performance of the transmission and collection systems of a LiDAR.

In one configuration described herein, a transmission cylinder lens or a group of cylindrical lenses with power in X direction is used to collimate light from an array of light sources in the X direction. A collection cylinder lens or a group of cylindrical lenses with power in Y direction is used to collimate the light from the array of light sources in the Y direction. Light reflected off objects is collected and focused by the same Y cylinder lens used to collimate the light from the array of light sources in the Y direction. However, the collection pathway and the transmission pathway use different portion of the Y cylinder lens. Since the transmission pathway and collection pathway use the same piece of Y cylinder lens, the image size is matched in the Y direction between the two pathways. Mismatch of image in the X direction is compensated for with adjustment of individual light sources in the X direction. In addition, the transmission pathway and the collection pathway are not overlapped, so stray light coupled from the transmission pathway to the collection pathway is avoided. Accordingly, in one aspect, disclosed herein are dual aperture LiDAR systems comprising: at least one array of laser light sources; a transmission optical system; a collection optical system; one or more cylindrical lenses with power in the Y direction shared the transmission optical system and the collection optical system; and at least one array of photodetectors comprising one photodetector paired with each laser light source in the at least one array of laser light sources; the transmission optical system comprising: a rod lens associated with each array of laser light sources and configured to partially collimate light from the light sources in the X direction; one or more cylindrical lenses with power in the X direction configured to further collimate the light from the light sources in the X direction; and the one or more cylindrical lenses with power in the Y direction configured to collimate the light from the light sources in the Y direction and provide a field of view in the Y direction; the collection optical system comprising: the one or more cylindrical lenses with power in the Y direction wherein at least some of the one or more cylindrical lenses with power in the Y direction are configured to focus the light in the Y direction from the light sources reflected from an environment external to the LiDAR system onto the at least one array of photodetectors; and one or more cylindrical lenses with power in the X direction wherein at least some of the one or more cylindrical lenses with power in the X direction are configured to focus the light in the X direction from the light sources reflected from an environment external to the LiDAR system onto the at least one array of photodetectors. In some embodiments, the LiDAR system comprises one array of laser light sources. In further embodiments, the array of laser light sources comprises 2 to 200 laser light sources. In some embodiments, the at least one array of laser light sources is linear. In some embodiments, the LiDAR system comprises 2 to 100 linear arrays of laser light sources forming a 2D array of laser light sources. In further embodiments, the 2D array of laser light sources comprises 4 to 2000 laser light sources. In a particular embodiment, each linear array of laser light sources comprises a single, planar printed circuit board. In some embodiments, the transmission optical system comprises one cylindrical lens with power in the X direction. In other embodiments, the transmission optical system comprises 2 to 10 cylindrical lenses with power in the X direction. In some embodiments, the transmission optical system comprises one cylindrical lens with power in the Y direction. In other embodiments, the transmission optical system comprises 2 to 10 cylindrical lenses with power in the Y direction. In some embodiments, the collection optical system comprises one cylindrical lens with power in the X direction. In other embodiments, the collection optical system comprises 2 to 10 cylindrical lenses with power in the X direction. In some embodiments, the collection optical system comprises one cylindrical lens with power in the Y direction. In other embodiments, the collection optical system comprises 2 to 10 cylindrical lenses with power in the Y direction. In some embodiments, the field of view in the Y direction is 3 degrees to 30 degrees. In other embodiments, the field of view in the Y direction is 25 degrees to 60 degrees. In a particular embodiment, each array of photodetectors comprises a single, planar printed circuit board. In some embodiments, the at least one array of laser light sources, the transmission optical system, the collection optical system, the one or more cylindrical lenses with power in the Y direction, and the at least one array of photodetectors are configured to rotate to create a field of view in the azimuth direction. In further embodiments, the field of view in the azimuth direction is 360 degrees. In some embodiments, the LiDAR system further comprises an enclosure. In further embodiments, the at least one array of laser light sources, the transmission optical system, the collection optical system, the one or more cylindrical lenses with power in the Y direction, and the at least one array of photodetectors are configured to rotate within the enclosure to create a field of view in the azimuth direction. In some embodiments, the enclosure has a first window allowing passage of light from the transmission optical system and a second window allowing passage of light to the collection optical system. In other embodiments, the enclosure has one window allowing passage of light from the transmission optical system and passage of light to the collection optical system. In some embodiments, the enclosure is a cylindrical pipe enclosure. In further embodiments, the one or more cylindrical lenses with power in the X direction are co-optimized with the enclosure to compensate the optical power introduced by the cylindrical pipe enclosure.

In another aspect, disclosed herein are LiDAR systems comprising: at least one array of laser light sources; a transmission optical system comprising at least one cylindrical lens with power in the X direction and excluding any spherical lens; a collection optical system comprising at least one cylindrical lens with power in the X direction and excluding any spherical lens; one or more cylindrical lenses with power in the Y direction shared by the transmission optical system and the collection optical system; and at least one array of photodetectors comprising one photodetector paired with each laser light source in the at least one array of laser light sources. In some embodiments, the LiDAR system comprises one array of laser light sources. In further embodiments, the array of laser light sources comprises 2 to 200 laser light sources. In some embodiments, the at least one array of laser light sources is linear. In further embodiments, the LiDAR system comprises 2 to 100 linear arrays of laser light sources forming a 2D array of laser light sources. In still further embodiments, the 2D array of laser light sources comprises 4 to 2000 laser light sources. In some embodiments, each linear array of laser light sources comprises a single, planar printed circuit board. In some embodiments, the transmission optical system comprises one cylindrical lens with power in the X direction. In other embodiments, the transmission optical system comprises 2 to 10 cylindrical lenses with power in the X direction. In some embodiments, the transmission optical system comprises one cylindrical lens with power in the Y direction. In other embodiments, the transmission optical system comprises 2 to 10 cylindrical lenses with power in the Y direction. In some embodiments, the collection optical system comprises one cylindrical lens with power in the X direction. In other embodiments, the collection optical system comprises 2 to 10 cylindrical lenses with power in the X direction. In some embodiments, the collection optical system comprises one cylindrical lens with power in the Y direction. In other embodiments, the collection optical system comprises 2 to 10 cylindrical lenses with power in the Y direction. In a particular embodiment, each array of photodetectors comprises a single, planar printed circuit board. In some embodiments, the at least one array of laser light sources, the transmission optical system, the collection optical system, the one or more cylindrical lenses with power in the Y direction, and the at least one array of photodetectors are configured to rotate to create a field of view in the azimuth direction. In further embodiments, the field of view in the azimuth direction is 360 degrees. In some embodiments, the LiDAR system further comprises an enclosure. In further embodiments, the at least one array of laser light sources, the transmission optical system, the collection optical system, the one or more cylindrical lenses with power in the Y direction, and the at least one array of photodetectors are configured to rotate within the enclosure to create a field of view in the azimuth direction. In some embodiments, the enclosure has a first window allowing passage of light from the transmission optical system and a second window allowing passage of light to the collection optical system. In other embodiments, the enclosure has one window allowing passage of light from the transmission optical system and passage of light to the collection optical system. In some embodiments, the enclosure is a cylindrical pipe enclosure. In further embodiments, the at least one cylindrical lens with power in the X direction of the transmission optical system or the collection optical system are co-optimized with the enclosure to compensate the optical power introduced by the cylindrical pipe enclosure.

In another configuration described herein, the Y cylinder lens is cut into two pieces. These two pieces of cylinder lens are from the same manufacturing process so that they share the same manufacturing tolerances and the same as-built optical performances. In this configuration, baffles and barriers can be added to block the unwanted stray light between the transmission and collection optical systems. Accordingly, in another aspect, disclosed herein are dual aperture LiDAR systems comprising: at least one array of laser light sources; a transmission optical system; a collection optical system; and at least one array of photodetectors comprising one photodetector paired with each laser light source in the at least one array of laser light sources; the transmission optical system comprising: a rod lens associated with each array of laser light sources and configured to partially collimate light from the light sources in the X direction; one or more cylindrical lenses with power in the X direction configured to further collimate the light from the light sources in the X direction; and one or more cylindrical lenses with power in the Y direction configured to collimate the light from the light sources in the Y direction and provide a field of view in the Y direction; the collection optical system comprising: one or more cylindrical lenses with power in the Y direction wherein at least some of the one or more cylindrical lenses with power in the Y direction are configured to focus the light in the Y direction from the light sources reflected from an environment external to the LiDAR system onto the at least one array of photodetectors;

and one or more cylindrical lenses with power in the X direction wherein at least some of the one or more cylindrical lenses with power in the X direction are configured to focus the light in the X direction from the light sources reflected from an environment external to the LiDAR system onto the at least one array of photodetectors. In some embodiments, the one or more cylindrical lenses with power in the Y direction of the transmission optical system and the one or more cylindrical lenses with power in the Y direction of the collection optical system are cut from a single original cylindrical lens such that manufacturing tolerances, and thus, optical performances are matched. In some embodiments, the LiDAR system further comprises a baffle between the transmission optical system and the collection optical system. In further embodiments, the baffle is opaque. In still further embodiments, the opaque baffle prevents light from the transmission optical system, which is not reflected from the environment external to the LiDAR system, from entering the collection optical system. In a particular embodiment, the baffle is opaque to light with wavelength in visible spectrum or longer. In some embodiments, the LiDAR system comprises one array of laser light sources. In further embodiments, the array of laser light sources comprises 2 to 200 laser light sources. In some embodiments, the at least one array of laser light sources is linear. In further embodiments, the LiDAR system comprises 2 to 100 linear arrays of laser light sources forming a 2D array of laser light sources. In still further embodiments, the 2D array of laser light sources comprises 4 to 2000 laser light sources. In a particular embodiment, each linear array of laser light sources comprises a single, planar printed circuit board. In some embodiments, the transmission optical system comprises one cylindrical lens with power in the X direction. In other embodiments, the transmission optical system comprises 2 to 10 cylindrical lenses with power in the X direction. In some embodiments, the transmission optical system comprises one cylindrical lens with power in the Y direction. In other embodiments, the transmission optical system comprises 2 to 10 cylindrical lenses with power in the Y direction. In some embodiments, the collection optical system comprises one cylindrical lens with power in the X direction. In other embodiments, the collection optical system comprises 2 to 10 cylindrical lenses with power in the X direction. In some embodiments, the collection optical system comprises one cylindrical lens with power in the Y direction. In other embodiments, the collection optical system comprises 2 to 10 cylindrical lenses with power in the Y direction. In some embodiments, the field of view in the Y direction is 3 degrees to 30 degrees. In other embodiments, the field of view in the Y direction is 25 degrees to 60 degrees. In a particular embodiment, each array of photodetectors comprises a single, planar printed circuit board. In some embodiments, the at least one array of laser light sources, the transmission optical system, the collection optical system, and the at least one array of photodetectors are configured to rotate to create a field of view in the azimuth direction. In further embodiments, the field of view in the azimuth direction is 360 degrees. In some embodiments, the LiDAR system further comprises an enclosure. In further embodiments, the at least one array of laser light sources, the transmission optical system, the collection optical system, and the at least one array of photodetectors are configured to rotate within the enclosure to create a field of view in the azimuth direction. In some embodiments, the enclosure has a first window allowing passage of light from the transmission optical system and a second window allowing passage of light to the collection optical system. In other embodiments, the enclosure has one window allowing passage of light from the transmission optical system and passage of light to the collection optical system. In some embodiments, the enclosure is a cylindrical pipe enclosure. In further embodiments, the one or more cylindrical lenses with power in the X direction are co-optimized with the enclosure to compensate the optical power introduced by the cylindrical pipe enclosure.

In another aspect, disclosed herein are LiDAR systems comprising: at least one array of laser light sources; a transmission optical system comprising at least one cylindrical lens with power in the X direction, at least one cylindrical lens with power in the Y direction, and excluding any spherical lens; a collection optical system comprising at least one cylindrical lens with power in the X direction, at least one cylindrical lens with power in the Y direction, and excluding any spherical lens; and at least one array of photodetectors comprising one photodetector paired with each laser light source in the at least one array of laser light sources; wherein the at least one cylindrical lens with power in the Y direction of the transmission optical system and the at least one cylindrical lens with power in the Y direction of the collection optical system are derived from a single original cylindrical lens such that optical performances are matched. In some embodiments, the one or more cylindrical lenses with power in the Y direction of the transmission optical system and the one or more cylindrical lenses with power in the Y direction of the collection optical system are cut from a single original cylindrical lens such that optical performances are matched. In some embodiments, the LiDAR system further comprises a baffle between the transmission optical system and the collection optical system. In some embodiments, the baffle is opaque. In still further embodiments, the opaque baffle prevents light from the transmission optical system, which is not reflected from the environment external to the LiDAR system, from entering the collection optical system. In some embodiments, the baffle is opaque to light with wavelength in visible spectrum or longer. In some embodiments, the LiDAR system comprises one array of laser light sources. In further embodiments, the array of laser light sources comprises 2 to 200 laser light sources. In some embodiments, the at least one array of laser light sources is linear. In further embodiments, the LiDAR system comprises 2 to 100 linear arrays of laser light sources forming a 2D array of laser light sources. In still further embodiments, the 2D array of laser light sources comprises 4 to 2000 laser light sources. In some embodiments, each linear array of laser light sources comprises a single, planar printed circuit board. In some embodiments, the transmission optical system comprises one cylindrical lens with power in the X direction. In other embodiments, the transmission optical system comprises 2 to 10 cylindrical lenses with power in the X direction. In some embodiments, the transmission optical system comprises one cylindrical lens with power in the Y direction. In other embodiments, the transmission optical system comprises 2 to 10 cylindrical lenses with power in the Y direction. In some embodiments, the collection optical system comprises one cylindrical lens with power in the X direction. In other embodiments, the collection optical system comprises 2 to 10 cylindrical lenses with power in the X direction. In some embodiments, the collection optical system comprises one cylindrical lens with power in the Y direction. In other embodiments, the collection optical system comprises 2 to 10 cylindrical lenses with power in the Y direction. In a particular embodiment, each array of photodetectors comprises a single, planar printed circuit board. In some embodiments, the at least one array of laser light sources, the transmission optical system, the collection optical system, and the at least one array of photodetectors are configured to rotate to create a field of view in the azimuth direction. In further embodiments, the field of view in the azimuth direction is 360 degrees. In some embodiments, the LiDAR system further comprises an enclosure. In further embodiments, the at least one array of laser light sources, the transmission optical system, the collection optical system, and the at least one array of photodetectors are configured to rotate within the enclosure to create a field of view in the azimuth direction. In some embodiments, the enclosure has a first window allowing passage of light from the transmission optical system and a second window allowing passage of light to the collection optical system. In other embodiments, the enclosure has one window allowing passage of light from the transmission optical system and passage of light to the collection optical system. In some embodiments, the enclosure is a cylindrical pipe enclosure. In further embodiments, the one or more cylindrical lenses with power in the X direction of the transmission optical system or the collection optical system are co-optimized with the enclosure to compensate the optical power introduced by the cylindrical pipe enclosure.

BRIEF DESCRIPTION OF THE DRAWINGS

An understanding of the features and advantages of the described subject matter will be obtained by reference to the following detailed description that sets forth illustrative embodiments and the accompanying drawings of which.

DETAILED DESCRIPTION OF THE INVENTION

Figure 1:
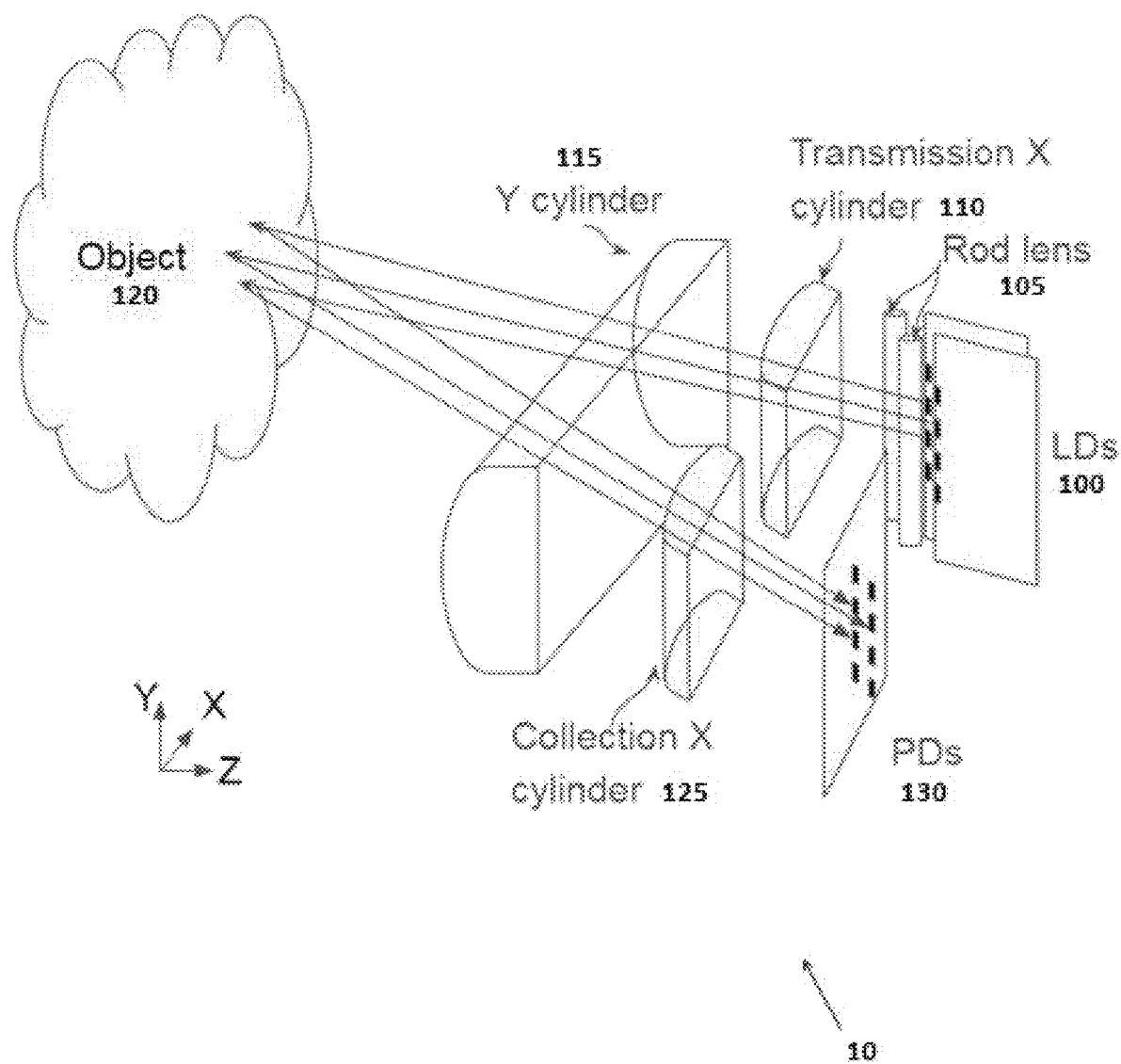
FIG. 1 shows a non-limiting schematic diagram of an optical system comprising a transmission optical system and a collection optical system; in this case, the transmission optical system and the collection optical system share a Y cylinder lens; and an array of light travels from the transmission optical system through a Y cylinder lens and a first X cylinder lens to an object and the light passes through a second X cylinder lens and the same Y cylinder lens in collection optical system when reflected by the object.

Described herein, in certain embodiments, are dual aperture LiDAR systems comprising: at least one array of laser light sources; a transmission optical system; a collection optical system; one or more cylindrical lenses with power in the Y direction shared the transmission optical system and the collection optical system; and at least one array of photodetectors comprising one photodetector paired with each laser light source in the at least one array of laser light sources; the transmission optical system comprising: a rod lens associated with each array of laser light sources and configured to partially collimate light from the light sources in the X direction; one or more cylindrical lenses with power in the X direction configured to further collimate the light from the light sources in the X direction; and the one or more cylindrical lenses with power in the Y direction configured to collimate the light from the light sources in the Y direction and provide a field of view in the Y direction; the collection optical system comprising: the one or more cylindrical lenses with power in the Y direction wherein at least some of the one or more cylindrical lenses with power in the Y direction are configured to focus the light in the Y direction from the light sources reflected from an environment external to the LiDAR system onto the array of photodetectors; and one or more cylindrical lenses with power in the X direction wherein at least some of the one or more cylindrical lenses with power in the X direction are configured to focus the light in the X direction from the light sources reflected from an environment external to the LiDAR system onto the array of photodetectors.

Also described herein, in certain embodiments, are LiDAR systems comprising: at least one array of laser light sources; a transmission optical system comprising at least one cylindrical lens with power in the X direction and excluding any spherical lens; a collection optical system comprising at least one cylindrical lens with power in the X direction and excluding any spherical lens; one or more cylindrical lenses with power in the Y direction shared by the transmission optical system and the collection optical system; and at least one array of photodetectors comprising one photodetector paired with each laser light source in the at least one array of laser light sources.

Also described herein, in certain embodiments, are dual aperture LiDAR systems comprising: at least one array of laser light sources; a transmission optical system; a collection optical system; and at least one array of photodetectors comprising one photodetector paired with each laser light source in the at least one array of laser light sources; the transmission optical system comprising: a rod lens associated with each array of laser light sources and configured to partially collimate light from the light sources in the X direction; one or more cylindrical lenses with power in the X direction configured to further collimate the light from the light sources in the X direction; and one or more cylindrical lenses with power in the Y direction configured to collimate the light from the light sources in the Y direction and provide a field of view in the Y direction; the collection optical system comprising: one or more cylindrical lenses with power in the Y direction wherein at least some of the one or more cylindrical lenses with power in the Y direction are configured to focus the light in the Y direction from the light sources reflected from an environment external to the LiDAR system onto the array of photodetectors; and one or more cylindrical lenses with power in the X direction wherein at least some of the one or more cylindrical lenses with power in the X direction are configured to focus the light in the X direction from the light sources reflected from an environment external to the LiDAR system onto the array of photodetectors.

Also described herein, in certain embodiments, are LiDAR systems comprising: at least one array of laser light sources; a transmission optical system comprising at least one cylindrical lens with power in the X direction, at least one cylindrical lens with power in the Y direction, and excluding any spherical lens; a collection optical system comprising at least one cylindrical lens with power in the X direction, at least one cylindrical lens with power in the Y direction, and excluding any spherical lens; and at least one array of photodetectors comprising one photodetector paired with each laser light source in the at least one array of laser light sources; wherein the at least one cylindrical lens with power in the Y direction of the transmission optical system and the at least one cylindrical lens with power in the Y direction of the collection optical system are derived from a single original cylindrical lens such that optical performances are matched.

Certain definitions

Unless otherwise defined, all technical terms used herein have the same meaning as commonly understood by one of ordinary skill in the art to which this invention belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

As used herein "Z direction," means the directions along optical axis.

As used herein "X direction," means the directions in a plane parallel to the transverse plane of photodetectors and perpendicular to Z direction.

As used herein "Y direction," means the directions in perpendicular to X direction and perpendicular to Z direction.

As used herein "Y cylinder," "Y cylinder lens," or "cylindrical lenses with power in Y direction" means one or more cylinder lenses that collimate or focus light in Y direction.

As used herein "X cylinder," "X cylinder lens," or "cylindrical lenses with power in X direction" means one or more cylinder lenses that collimate or focus light in X direction.

As used herein "shared," with regard to lenses, means the same cylindrical lens is used for both a transmission optical system and a collection optical system, wherein the path of light with regard to the two optical systems through the shared lens is optionally separate, partially overlapped, or completely overlapped.

Transmission Optical System

In some embodiments, the platforms, systems, media, and methods described herein include a transmission optical system, or use of the same. A transmission optical system comprises an array of laser diodes, one or more X cylinder lens, and one or more Y cylinder lens. Transmission optical system emits light from its array of laser diodes, which passes through rod lens, X cylinder and Y cylinder lenses in the transmission optical system pathway and in the process becomes collimated. The collimated light illuminates object in the surroundings and the light is reflected or scattered by the object. The reflected or scattered light is collected by collection optical system and focused by X cylinder and Y cylinder lenses in the collection optical system pathway onto photodetectors, which covert light to signal for processing like depth determination and image processing.

Many configurations are suitable for transmission optical system. In some embodiments, the transmission optical system comprises one X cylinder lens and one Y cylinder lens. In some embodiments, the transmission optical system comprises more than one X cylinder lens and more than Y cylinder lens. In some embodiments, the transmission optical system comprises more than one X cylinder lens and one Y cylinder lens. In some embodiments, the transmission optical system comprises one X cylinder lens and more than one Y cylinder lens. In some embodiments, the transmission optical system comprises about 2, about 5, about 10, about 20 or more X cylinder lenses, including increments therein. In some embodiments, the transmission optical system comprises about 2, about 5, about 10, about 20 or more Y cylinder lenses, including increments therein.

Referring to FIG. 1, in a particular embodiment, a transmission optical system emits and collimates light to actively illuminate an object 120. Continuing to refer to FIG. 1, in a particular embodiment, a transmission optical system comprises laser diodes (LDs) 100, rod lens 105, transmission X cylinder 110, and Y cylinder 115. A Y cylinder 115 is shared in both collection optical system and transmission optical system. A transmission X cylinder 110 collimates emitted laser light from LDs in X direction and a Y cylinder 115 collimates the laser light in Y direction to achieve a uniform distribution of parallel light rays onto an object 120. Rod lenses 105 associated with LDs 100 partially collimate the light in the X direction before it reaches the transmission X cylinder 110.

Figure 2:
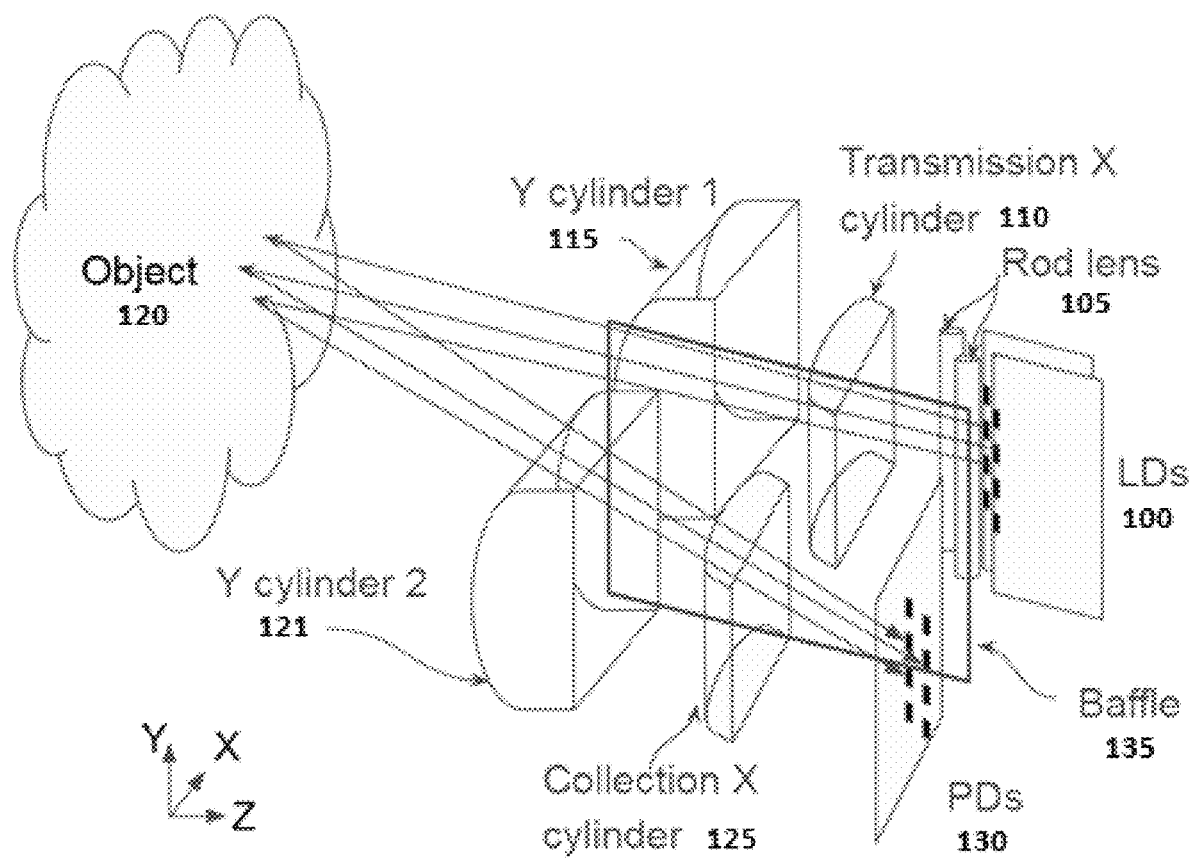
FIG. 2 shows a non-limiting schematic diagram of an optical system comprising a transmission optical system and a collection optical system; in this case, the transmission optical system and the collection optical system are physically separated by a baffle; and an array of light travels from the transmission optical system through a first X cylinder lens and a first Y cylinder lens and passes through a second Y cylinder lens and second X cylinder lens when reflected by an object; and the first Y cylinder lens and the second Y cylinder lens are derived from (e.g., cut from, etc.) a single Y cylinder lens.

Referring to FIG. 2, in a particular embodiment, a single Y cylinder is cut to form Y cylinder 115 of transmission optical system and Y cylinder 121 of collection optical system. A transmission X cylinder 110 and a transmission Y cylinder 115 collimate the laser light from LDs 100 in X and Y directions, respectively to form a uniform distribution of parallel light rays onto an object 120. A baffle 135 physically separates transmission X cylinder 110 and transmission Y cylinder 115 from collection Y cylinder 121 and collection X cylinder 125.

Again referring to FIG. 1, in a particular embodiment, transmission X cylinder 110 is positioned closer to LDs 100 than Y cylinder 115 such that the emitted light from LDs 100 pass through transmission X cylinder 110 before passing through Y cylinder 115. In some embodiments, Y cylinder is positioned closer to LDs than transmission X cylinder such that the emitted light from LDs passes through the Y cylinder before passing through the transmission X cylinder.

Array of laser light sources

In some embodiments, the platforms, systems, media, and methods described herein include an array of laser light source, or use of the same. An array of laser light source emits light which becomes collimated as it passes X cylinder and Y cylinder lenses in the transmission collection pathway. The collimated light illuminates object in the surroundings and the light is reflected or scattered by the object. The reflected or scattered light is collected by collection optical system and focused by X cylinder and Y cylinder lenses in the collection optical system pathway onto photodetectors, which covert light to signal for processing like depth determination and image processing.

In some embodiments, an array of laser light source comprises about 2, about 5, about 10, about 20, about 50, about 75, about 100, or more laser light sources, including increments therein. In some embodiments, an array of laser light sources comprises about 4, about 10, about 20, about 50, about 100, about 200, about 500, about 1000, about 2000, or more laser light sources, including increments therein. In some embodiments, an array of laser light sources comprises at least 2, at least 5, at least 10, at least 20, at least 50, at least 75, at least 100, or more laser light sources, including increments therein. In some embodiments, an array of laser light sources comprises at least 4, at least 10, at least 20, at least 50, at least 100, at least 200, at least 500, at least 1000, at least 2000, or more laser light sources, including increments therein.

In some embodiments, an array of laser light source comprises an array of laser diodes. In some embodiments, array of laser light source comprise of linear array of laser diodes. In some embodiments, a linear array of laser diodes is mounted onto edges of individual planar boards in parallel fashion and the planar boards are arranged parallel to each other as to form 2D array of laser light source.

In some embodiments, an array of laser light source comprises a linear array of laser diodes on a single, planar board. In some embodiments, a laser light source comprises a 2D array of laser diodes on a single, planar board.

In some embodiments, an array of laser light source comprises an array of laser diodes. In some embodiments, an array of laser diodes is mounted onto edges of individual boards in parallel fashion and the boards are arranged parallel to each other with the edges not in an alignment as to form 3D array of laser light source.

In some embodiments, an array of laser light source comprises an array of laser diodes on a single, curved board.

In some embodiments, an array of laser light source comprises pulsed laser diodes. In some embodiments, an array of laser light sources pulses at about 5,000 Hz, about 10,000 Hz, about 20,000 Hz, about 50,000 Hz, about 100,000 Hz, about 250,000 Hz, or more, including increments therein. In some embodiments, an array of laser light source pulses at least 5,000 Hz, at least 10,000 Hz, at least 20,000 Hz, at least 50,000 Hz, at least 100,000 Hz, at least 250,000 Hz, or more, including increments therein. In some embodiments, an array of laser light source emits a light with wavelengths about 200 nm, about 500 nm, about 1000 nm, about 2000 nm, about 5000 nm, about 10,000 nm, about 15,000 nm, or more, including increments therein. In some embodiments, an array of laser light source emits a light with wavelengths at least 200 nm, at least 500 nm, at least 1000 nm, at least 2000 nm, at least 5000 nm, at least 10,000 nm, at least 15,000 nm, or more, including increments therein.

Referring to FIG. 1, in a particular embodiment, an array of laser light source comprises an array of laser diodes (LDs) 100 that emits light which transmits through X cylinder 110 and Y cylinder 115 lenses and illuminates an object 120. The light reflected from the object 120 then passes through collection Y cylinder 115 and collection X cylinder 125 lenses and focuses onto photodetectors 130.

Collection optical system

In some embodiments, the platforms, systems, media, and methods described herein include a collection optical system, or use of the same. A collection optical system collects scattered or reflected light from object in the surroundings wherein the light is originally emitted and collimated in transmission optical system through X cylinder and Y cylinder lenses and illuminates the object. The collection optical system focuses the scattered or reflected light from the object through X cylinder and Y cylinder lenses onto photodetectors, which convert the light to signal for processing like depth determination and image processing.

Many configurations are suitable for collection optical system. In some embodiments, the collection optical system comprises one X cylinder lens and one Y cylinder lens. In some embodiments, the collection optical system comprises more than one X cylinder lens and more than Y cylinder lens. In some embodiments, the collection optical system comprises more than one X cylinder lens and one Y cylinder lens. In some embodiments, the collection optical system comprises one X cylinder lens and more than one Y cylinder lens. In some embodiments, the collection optical system comprises about 2, about 5, about 10, about 20 or more X cylinder lenses, including increments therein. In some embodiments, the collection optical system comprises about 2, about 5, about 10, about 20 or more Y cylinder lenses, including increments therein.

Referring to FIG. 1, in a particular embodiment, a collection optical system comprises Y cylinder 115, collection X cylinder 125, and photodetectors (PDs) 130. Y cylinder 115 is shared in both collection optical system and transmission optical system. Y cylinder 115 focuses the reflected light from the object 120 in Y direction and collection X cylinder 125 focuses the light in X direction onto PDs 130.

In some embodiments, a single Y cylinder is cut to form a transmission Y cylinder and a collection Y cylinder. In some embodiments, a baffle physically separates a transmission optical system and a collection optical system. Referring to FIG. 2, in a particular embodiment, collection optical system comprises collection Y cylinder 121, collection X cylinder 125, and PDs 130. Collection Y cylinder 121 focuses the reflected light from object 120 in Y direction and collection X cylinder 125 focuses the light in X direction onto PDs 130. In some embodiments, a baffle 135 physically separates transmission X cylinder 110 and transmission Y cylinder 115 from collection Y cylinder 121 and collection X cylinder.

Referring to FIG. 1, in a particular embodiment, Y cylinder 115 is positioned further away from PDs 130 than collection X cylinder 125 such that the reflected light from object 120 passes through Y cylinder 115 before passing through collection X cylinder 125. In some embodiments, a collection X cylinder is positioned further away from PDs than a Y cylinder such that the reflected light from an object passes through collection X cylinder before passing through Y cylinder.

Again referring to FIG. 2, in a particular embodiment, Y cylinder 121 is positioned further away from PDs 130 than collection X cylinder 125 such that the reflected light from object 120 passes through Y cylinder 121 before passing through collection X cylinder 125. In some embodiments, collection X cylinder is positioned further away from PDs than collection Y cylinder such that the reflected light from an object passes through collection X cylinder before passing through collection Y cylinder 121.

Array of photodetectors

In some embodiments, the platforms, systems, media, and methods described herein include one or more arrays of photodetectors, or use of the same. An array of photodetectors receives light that is reflected or scattered by object in the surrounding and focused onto the array of photodetectors by X cylinder and Y cylinder lenses in collection optical system. The light is originally emitted by laser diodes in transmission optical system and collimated by X cylinder and Y cylinder lenses in the transmission optical system before illuminating the object in the surrounding. The photodetectors convert light to signal for processing like depth determination and image processing.

In some embodiments, each photodetector in an array of photodetector is paired with each laser light source to detect and input reflected light from an object.

In some embodiments, an array of photodetectors comprises about 2, about 5, about 10, about 20, about 50, about 75, about 100, or more photodetectors, including increments therein. In some embodiments, an array of photodetector comprises about 4, about 10, about 20, about 50, about 100, about 200, about 500, about 1000, about 2000, or more photodetectors, including increments therein. In some embodiments, an array of photodetectors comprises at least 2, at least 5, at least 10, at least 20, at least 50, at least 75, at least 100, or more photodetectors, including increments therein. In some embodiments, an array of photodetectors comprises at least 4, at least 10, at least 20, at least 50, at least 100, at least 200, at least 500, at least 1000, at least 2000, or more photodetectors, including increments therein.

In some embodiments, an array of photodetectors comprises photodetectors on a single, planar circuit board. In some embodiments, an array of photodetectors comprises photodetectors on a single, curved circuit board.

In some embodiments, an array of photodetector comprises photodiodes. Non-limiting examples of photodiodes include PIN, avalanche, InGaAs, Si photodiodes. In some embodiments, an array of photodetector comprises metal-semiconductor-metal photodetectors. In some embodiments, an array of photodetector comprises phototransistors. In some embodiments, an array of photodetectors comprises photoresistors. In some embodiments, an array of photodetector comprises phototubes. In some embodiments, an array of photodetector comprises photomultipliers. In some embodiments, an array of photodetectors comprises pyroelectric photodetectors. In some embodiments, an array of photodetectors comprises thermal detectors. In some embodiments, an array of photodetectors comprise of carbon nanotubes and graphene.

Enclosure

In some embodiments, the platforms, systems, media, and methods described herein include an enclosure, or use of the same. In some embodiments, an enclosure encases a transmission optical system and a collection optical system. The enclosure has one or more windows through which collimated light emitted from transmission optical system is allowed to pass through. The transmitted light illuminates object in the surroundings and is scattered or reflected by the object. The scattered or reflected light passes through a window in the enclosure and is focused onto an array of photodetectors by X cylinder and Y cylinder lenses in collection optical system. The array of photodetectors converts the light to signal for processing like depth determination or imaging processing.

In some embodiments, an enclosure comprises a hollow cylindrical pipe with a window at one end to allow the passage of light from a transmission optical system and to allow light into a collection optical system. In some embodiments, an enclosure comprises a first window to allow passage of light from transmission optical system and a second window to allow passage of light to collection optical system. In some embodiments, an enclosure comprises a hollow rectangular box with a window at one end to allow passage of light from a transmission optical system and to allow light into a collection optical system. In some embodiments, an enclosure comprises a hollow rectangular box with a first window to allow passage of light from transmission optical system and a second window to allow passage of light to collection optical system.

In some embodiments, an enclosure comprises an opaque material to prevent passage of light through the enclosure other than to through one or more windows. In some embodiments, the window comprises a transparent material.

In some embodiments, the window is wedge-shaped to reduce interference fringes such as etalon fringe.

In some embodiments, an enclosure comprises a thermal stabilizing component to dissipate the heat generated from laser light source and photodetectors.

Baffle

In some embodiments, the platforms, systems, media, and methods described herein include a baffle, or use of the same. A baffle reduces or blocks light from transmission optical system or collection optical system entering the other system. In some cases, it physically separates the transmission optical system and collection optical system such that the light from one system does not significantly bleed into the other system, reducing light contamination. A baffle also reduces unwanted light from the surroundings by absorbing or reflecting the unwanted light.

In various embodiments, the opaque material reduces transmission of light in visible, infrared, ultraviolet spectrum, or any combination thereof. In various embodiments, the opaque material blocks transmission of light in visible, infrared, ultraviolet spectrum, or any combination thereof. In some embodiments, the opaque material reduces transmission of light in electromagnetic spectrum. In some embodiments, the opaque material blocks transmission of light in electromagnetic spectrum. In some embodiments, a baffle comprises a transparent material with an opaque coating. In some embodiments, the opaque coating reduces transmission of light in visible, infrared, ultraviolet spectrum, or any combination thereof. In some embodiments, the opaque coating blocks transmission of light in visible, infrared, ultraviolet spectrum, or any combination thereof. In some embodiments, the opaque coating reduces transmission of light in electromagnetic spectrum. In some embodiments, the opaque coating blocks transmission of light in electromagnetic spectrum. In some embodiments, a baffle comprises an optical black coating to absorb stray lights and unwanted lights from the environment such as sunlight. In some embodiments, the optical black coating absorbs light in visible, infrared, ultraviolet spectrum, or any combination thereof. In some embodiments, a baffle comprises a reflective material.

In some embodiments, the baffle comprises a plurality of baffles wherein each of the baffle comprises a rear facing curved surface and a front facing curved surface that form a small tooth-like structure along the length of the baffle to reflect the unwanted light from the environment off of the focal plane.

Referring to FIG. 2, in a particular embodiment, the baffle 135 physically separates the Y cylinder 115 lens between transmission pathway and collection pathway and blocks the unwanted stray light from bleeding into the other pathway. In some embodiments, a baffle comprises an opaque material.

EXAMPLES

The following illustrative examples are representative of embodiments of the subject matter described herein and are not meant to be limiting in any way.

Example 1

Goods Delivery

An autonomous vehicle operates as a delivery vehicle in San Francisco. It is configured to carry hot and cold meals as well as groceries around the city on customers' demand. Upon an order from a customer, the destination is automatically inputted into the autopilot of the vehicle. The vehicle is loaded with the requested items and the autopilot drives the vehicle toward the inputted destination. The autopilot functions by processing the 2D images and distance data taken from a LiDAR system. The LiDAR system is encased and attached to the top of the vehicle. The LiDAR system rotates at a high speed in the azimuth direction as the vehicle moves, providing a 360 degree view of the vehicle's surroundings over the distance. The collected information is analyzed by the autopilot to make assessment of the speed, direction, and other factors in planning the path of the vehicle during the travel.

The LiDAR system determines the distance to surrounding objects by measuring the time for a light pulse to travel from LiDAR system to being reflected or scattered by objects. As presented in FIG. 1 herein, distance to individual positions on object 120 is calculated by measuring the time of flight for a light to travel from a laser on LDs 100 to reach the corresponding photodetector on PDs 130. LDs 100 consisting of a linear array of laser diodes emit light that passes rod lens 105 which partially collimates the light in X direction. The light is then transmitted through transmission X cylinder 110 and Y cylinder 115 which collimate the light in X and Y directions, respectively. The collimated light passes through a first window on enclosure to illuminate object 120 within the field of view. The light is reflected by the object 120 through backscattering. The reflected light passes through a second window to collection optical system in the enclosure. Y cylinder 115 and collection X cylinder 125 focus the reflected light in Y and X direction onto PDs 130. Y cylinder 115 is shared between transmission optical system and collection optical system, so that the image size from transmission path matches that of collection path. LDs 100, Y cylinder 115, and PDs 130 are configured in such a way that the field of view in Y direction is 40 degree. The enclosure comprising transmission optical system and collection optical system rotates 360 degrees to provide a full field of view in the azimuth direction.

Example 2

Personal Transport

An autonomous vehicle operates as a personal vehicle in San Francisco. It is configured to carry passengers anywhere upon command. Once the destination is inputted into the autopilot of the vehicle by the user, the autopilot drives the vehicle toward the inputted destination. The autopilot functions by processing the 2D images and distance data taken from a LiDAR system. The LiDAR system is encased and attached to the top of the vehicle. The LiDAR system rotates at a high speed in azimuth direction as the vehicle moves, providing a 360 degree view of the vehicle's surroundings over the distance. The collected information is analyzed by the autopilot to make assessment of the speed, direction, and other factors in planning the path of the vehicle during the travel.

The LiDAR system determines the distance to surrounding objects by measuring the time for a light pulse to travel from LiDAR system to being reflected or scattered by objects. As presented in FIG. 2 herein, distance to individual positions on object 120 is calculated by measuring the time of flight for a light to travel from a laser on LDs 100 to reach the corresponding photodetector on PDs 130. The transmission optical system and collection optical system are physically separated by a baffle 135. Rod lens 105 and transmission X cylinder 110 collimate the light emitted from LDs 100. Y cylinder 115 collimates the light in Y direction. The collimated light passes through a first window on enclosure to illuminate object 120 within the field of view. The light is reflected back by the object 120 and passes through a second window to collection optical system in the enclosure. Y cylinder 121 and collection X cylinder 125 focus the reflected light in Y and X direction on PDs 130. Y cylinder 115 in transmission optical system and Y cylinder 121 in collection optical system are cut from same Y cylinder lens such that the image size from transmission path matches that of collection path. Y cylinder lenses and PDs 130 are configured in such a way that the field of view in Y direction is 40 degree. The enclosure comprising transmission optical system and collection optical system rotates 360 degrees to provide a full field of view in the azimuth direction.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A LiDAR system comprising:
   at least one array of laser light sources;
   a transmission optical system comprising at least one transmission optical system cylindrical lens with power in an X direction and excluding any spherical lens;
   a collection optical system comprising at least one collection optical system cylindrical lens with power in the X direction and excluding any spherical lens;
   one or more cylindrical lenses with power in a Y direction shared by the transmission optical system and the collection optical system;
   at least one array of photodetectors comprising one photodetector paired with each laser light source in the at least one array of laser light sources, wherein the one or more cylindrical lenses with power in the Y direction is positioned at a different distance away from the at least one array of photodetectors than the at least one collection optical system cylindrical lens; and
   wherein at least one laser light source of the at least one array of laser light sources is adjustable in a direction that is associated with the at least one transmission optical system cylindrical lens and the at least one collection optical system cylindrical lens.

2. The LiDAR system of claim 1, wherein the at least one array of laser light sources includes two or more linear arrays of laser light sources that form a 2D array of laser light sources.

3. The LiDAR system of claim 1, wherein at least one laser light source of the at least one array of laser light sources is individually adjustable in the direction that is associated with the at least one transmission optical system cylindrical lens and the at least one collection optical system cylindrical lens to compensate for a mismatch in optical performance between the at least one transmission optical system cylindrical lens and the at least one collection optical system cylindrical lens.

4. The LiDAR system of claim 1, wherein each array of photodetectors comprises a single, planar printed circuit board, and wherein the one or more cylindrical lenses with power in the Y direction is positioned further away from the at least one array of photodetectors than the at least one collection optical system cylindrical lens.

5. The LiDAR system of claim 1, wherein the at least one array of laser light sources, the transmission optical system, the collection optical system, the one or more cylindrical lenses with power in the Y direction, and the at least one array of photodetectors are configured to rotate to create a field of view in the azimuth direction.

6. The LiDAR system of claim 1, further comprising an enclosure, the enclosure configured to encase the transmission optical system and the collection optical system, wherein the enclosure includes at least one window through which light emitted from the transmission optical system passes through.

7. The LiDAR system of claim 6, wherein the at least one array of laser light sources, the transmission optical system, the collection optical system, the one or more cylindrical lenses with power in the Y direction, and the at least one array of photodetectors are configured to rotate within the enclosure to create a field of view in the azimuth direction, wherein the field of view is approximately a 360 degree view.

8. A dual aperture LiDAR system comprising:
at least one array of laser light sources;
a transmission optical system;
a collection optical system; and
at least one array of photodetectors comprising one photodetector paired with each laser light source in the at least one array of laser light sources,
wherein the transmission optical system comprises
  a) a rod lens associated with each array of laser light sources and configured to partially collimate light from the light sources in an X direction,
  b) one or more cylindrical lenses with power in the X direction configured to further collimate the light from the light sources in the X direction, and
  c) one or more cylindrical lenses with power in a Y direction configured to collimate the light from the light sources in the Y direction and provide a field of view in the Y direction, and
wherein the collection optical system comprises
  a) one or more cylindrical lenses with power in the Y direction wherein at least some of the one or more cylindrical lenses with power in the Y direction are configured to focus the light in the Y direction from the light sources reflected from an environment external to the LiDAR system onto the at least one array of photodetectors, and
  b) one or more cylindrical lenses with power in the X direction wherein at least some of the one or more cylindrical lenses with power in the X direction are configured to focus the light in the X direction from the light sources reflected from an environment external to the LiDAR system onto the at least one array of photodetectors, and
wherein at least one laser light source of the at least one array of laser light sources is adjustable in the X direction.

9. The LiDAR system of claim 8, wherein the one or more cylindrical lenses with power in the Y direction of the transmission optical system and the one or more cylindrical lenses with power in the Y direction of the collection optical system are derived from a single original cylindrical lens such that optical performances are matched.

10. The LiDAR system of claim 8, further comprising a baffle between the transmission optical system and the collection optical system.

11. The LiDAR system of claim 8, wherein the at least one array of laser light sources is linear, and wherein the light passes the rod lens before being transmitted though the one or more cylindrical lenses of the transmission optical system with power in the X direction.

12. The LiDAR system of claim 8, wherein each array of photodetectors comprises a single, planar printed circuit board.

13. A LiDAR system comprising:
at least one array of laser light sources;
a transmission optical system comprising at least one cylindrical lens with power in an X direction, at least one cylindrical lens with power in a Y direction, and excluding any spherical lens;
a collection optical system comprising at least one cylindrical lens with power in the X direction, at least one cylindrical lens with power in the Y direction, and excluding any spherical lens;
at least one array of photodetectors comprising one photodetector paired with each laser light source in the at least one array of laser light sources, wherein the at least one cylindrical lens with power in the Y direction of the transmission optical system and the at least one cylindrical lens with power in the Y direction of the collection optical system are derived from a single original cylindrical lens such that optical performances are matched; and
wherein at least one laser light source of the at least one array of laser light sources is adjustable in a direction in which optical performances of lenses of the transmission optical system and the collection optical system are not matched.

14. The LiDAR system of claim 13, wherein the one or more cylindrical lenses with power in the Y direction of the transmission optical system and the one or more cylindrical lenses with power in the Y direction of the collection optical system are cut from a single original cylindrical lens such that optical performances are matched, wherein an image size is matched in the Y direction between a transmission pathway associated with the transmission optical system and a collection pathway associated with the collection optical system.

15. The LiDAR system of claim 13, further comprising a baffle between the transmission optical system and the collection optical system.

16. The LiDAR system of claim 13, wherein each array of photodetectors comprises a single, planar printed circuit board.

17. The LiDAR system of claim 13, wherein the at least one array of laser light sources, the transmission optical system, the collection optical system, the one or more cylindrical lenses with power in the Y direction, and the at least one array of photodetectors are configured to rotate to create a field of view in the azimuth direction, wherein the field of view is approximately a 360 degree view.

18. The LiDAR system of claim 13, wherein the at least one array of laser light sources, the transmission optical system, the collection optical system, the one or more cylindrical lenses with power in the Y direction, and the at least one array of photodetectors are configured to rotate within the enclosure to create a field of view in the azimuth direction.

19. The LiDAR system of claim 8, wherein the rod lens associated with the each array of laser light sources and configured to partially collimate light from the light sources in the X direction is arranged to partially collimate the light from the light sources in the X direction before the light reaches the one or more cylindrical lenses with power in the X direction.

20. The LiDAR system of claim 13, wherein the at least one laser light source of the at least one array of laser light sources is individually adjustable to compensate for a mismatch in optical performances of lenses of the transmission optical system and the collection optical system.

* * * * *